United States Patent
Washbourne et al.

(10) Patent No.: US 10,215,869 B2
(45) Date of Patent: Feb. 26, 2019

(54) SYSTEM AND METHOD OF ESTIMATING ANISOTROPY PROPERTIES OF GEOLOGICAL FORMATIONS USING A SELF-ADJOINT PSEUDOACOUSTIC WAVE PROPAGATOR

(71) Applicant: CHEVRON U.S.A. INC., San Ramon, CA (US)

(72) Inventors: John Kenneth Washbourne, Houston, TX (US); Kenneth Paul Bube, Seattle, WA (US); Raymond Andrew Ergas, San Clemente, CA (US); Tamas Nemeth, Palo Alto, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 241 days.

(21) Appl. No.: 15/084,657

(22) Filed: Mar. 30, 2016

(65) Prior Publication Data

US 2016/0291180 A1 Oct. 6, 2016

Related U.S. Application Data

(60) Provisional application No. 62/140,301, filed on Mar. 30, 2015.

(51) Int. Cl.
*G01V 1/00* (2006.01)
*G01V 1/28* (2006.01)
*G01V 1/30* (2006.01)

(52) U.S. Cl.
CPC ............ *G01V 1/306* (2013.01); *G01V 1/282* (2013.01); *G01V 2210/626* (2013.01); *G01V 2210/675* (2013.01); *G01V 2210/679* (2013.01)

(58) Field of Classification Search
None
See application file for complete search history.

(56) References Cited

U.S. PATENT DOCUMENTS

2009/0213693 A1\* 8/2009 Du .................. G01V 1/282
367/73
2013/0060544 A1 3/2013 Bakker et al.
2013/0311151 A1\* 11/2013 Plessix ............... G01V 1/30
703/2

FOREIGN PATENT DOCUMENTS

WO WO2010/014379 2/2010

OTHER PUBLICATIONS

Fletcher, R.P., et al. "Reverse time migration in tilted transversely isotropic media", Geophysics, Socieity of Exploration Geophysicists, Nov. 1, 2009, vol. 74, pp. WCA179-WCA187.

(Continued)

*Primary Examiner* — Calvin Y Choi
(74) *Attorney, Agent, or Firm* — Marie L. Clapp (57) ABSTRACT

A method is described that includes receiving one or more seismic measurements corresponding to a plurality of source and receiver locations and providing an earth model for a geologic medium having a heterogeneous tilted symmetry axis. The earth model includes a nonzero shear velocity in the direction of the symmetry axis. The one or more seismic measurements are propagated over a plurality of time-steps in accordance with the earth model and a set of energy-conservative self-adjoint pseudoacoustic equations. The set of energy-conservative self-adjoint pseudoacoustic equations describes one or more seismic wavefields.

9 Claims, 6 Drawing Sheets

(56) References Cited

OTHER PUBLICATIONS

Zhang, Yu, et al. "A stable TTI reverse time migration and its implementation" SEG Houston 2009 International Exposition and Annual Meeting, Jan. 1, 2009, pp. 2794-2798.

PCT Notification of Transmittal of the International Search Report and the Written Opinion of the International Searching Authority, or the Declaration, dated Feb. 19, 2015, 10 pages.

PCT Notification of Transmittal of the International Search Report and the Written Opinion of the International Searching Authority, or the Declaration, dated May 27, 2015, 10 pages.

* cited by examiner

SYSTEM AND METHOD OF ESTIMATING ANISOTROPY PROPERTIES OF GEOLOGICAL FORMATIONS USING A SELF-ADJOINT PSEUDOACOUSTIC WAVE PROPAGATOR

TECHNICAL FIELD

The disclosed embodiments relate generally to techniques for seismic data acquisition, processing, interpretation, and estimation of properties of geologic formations during geophysical exploration, and more specifically to pseudoacoustic wave propagators for tilted transverse isotropic media.

BACKGROUND

Seismic exploration involves surveying subterranean geological media for hydrocarbon deposits and estimating various physical properties of the geological formations. Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

A survey typically involves deploying seismic source(s) and seismic sensor(s) at predetermined locations. The sources generate seismic waves, which propagate into a geological medium creating pressure changes and vibrations along their way. Variations in physical properties of the geological medium change the seismic waves, such as their direction of propagation and other properties. Parts of the seismic waves reach the seismic sensors. Some seismic sensors are sensitive to pressure changes (hydrophones), others to particle motion (e.g., geophones), and industrial surveys may deploy only one type of sensors or both. In response to the detected seismic waves, the sensors generate corresponding electrical signals and record them in storage media as seismic data.

Analysis of the seismic data can be performed to process the seismic data into an image of the geological medium. This image and additional seismic attributes are used to estimate the physical properties of the geological formations and their hydrocarbon bearing potential. Reverse-time migration (RTM) propagates wavefields at the source locations into the geological medium forward in time and recorded wavefields at the receiver locations into the geological medium backward in time and then correlates the two types of wavefields to form an image of the geological medium. Full waveform inversion (FWI) goes a step further and similarly to RTM produces an image of the geological medium but additionally it requires that the simulated wavefields from this image closely match the acquired data. This is typically accomplished by using iterative inversion techniques. To reduce the computational cost of RTM and FWI while still allowing anisotropy, pseudoacoustic systems of differential equations are constructed that are less computationally expensive than using a fully elastic system. Some conventional approaches modify the dispersion relation for either the fully elastic system or a pseudoacoustic approximation (e.g., a 2×2 second-order pseudoacoustic systems of differential equations) by setting an S-wave velocity to be zero, and eliminating one or more corresponding terms in the pseudoacoustic system of differential equations. Unfortunately, because physical conservation laws may not be satisfied under such approximations, doing so can result in the introduction of instabilities. These instabilities arise from stationary noise that grows with time, thus making imaging of deeper layers or complex geological structures in the geological medium difficult. Moreover, it has been found that these instabilities can persist even when the S-wave velocity is artificially set to be greater than zero. This is an even larger problem for FWI, for two reasons. Firstly, it is typically an iterative procedure and any instability is significantly amplified during the iterations. Secondly, inversion methods such as FWI require that the backward and forward wavefields are propagated via adjoint propagator methods to satisfy the requirements of the inversion algorithms. This requirement is not currently satisfied in FWI applications for tilted transverse isotropy (TTI) medium and approximate and ad hoc forward and backward propagator pairs are used greatly reducing fidelity and efficiency.

SUMMARY

Accordingly, there is a need for TTI wave propagators that mitigate or eliminate such instabilities and form adjoint forward and backward propagator pairs for stable and efficient inversion. In accordance with some embodiments, a method is performed at an electronic device with one or more processors and memory. The method includes providing an earth model for a geologic medium. The geologic medium has a heterogeneous tilted symmetry axis, and the earth model includes a nonzero shear velocity in the direction of the symmetry axis for at least a subset of locations within the geologic medium. The electronic device processes one or more seismic measurements using a set of second-order self-adjoint pseudoacoustic equations applied in accordance with the earth model. The set of self-adjoint pseudoacoustic equations includes a first equation describing one or more seismic wavefields and a second equation describing the one or more seismic wavefields. The processing includes propagating the one or more seismic wavefields over a plurality of time-steps in accordance with the set of self-adjoint pseudoacoustic equations, at least one in the forward time marching and at least one in backward time marching directions. Then the two types of wavefields are correlated to form an update to the model of the TTI geological medium. This process is repeated for a number of iterations until a predetermined criterion is satisfied. The obtained is model is used to estimate the TTI anisotropy material properties of the geological formations.

In another aspect of the present invention, to address the aforementioned problems, some embodiments provide a non-transitory computer readable storage medium storing one or more programs. The one or more programs comprise instructions, which when executed by an electronic device with one or more processors and memory, cause the electronic device to perform any of the methods provided herein.

In yet another aspect of the present invention, to address the aforementioned problems, some embodiments provide an electronic device. The electronic device includes one or more processors, memory, and one or more programs. The one or more programs are stored in memory and configured to be executed by the one or more processors. The one or more programs include an operating system and instructions that when executed by the one or more processors cause the electronic device to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described in more detail below is a method of estimating the anisotropy properties of geological formations by modeling a wavefield in a geologic medium that mitigates and/or eliminates the instabilities associated with pseudoacoustic approximations to the fully elastic wave equation by providing a self-adjoint forward and backward modeling pair for iterative inversion. In accordance with some embodiments, an earth model for a geologic medium (sometimes called a "velocity model") is provided that specifies various characteristics of a geologic medium, such a shear (S) wave velocities, compressional (P) wave velocities, stiffness parameters (e.g., a stiffness tensor) and/or anisotropy parameters (e.g., a dip angle or Thomsen parameter $\delta$), and density for a plurality of locations within the geologic medium (e.g., locations specified by a computational grid). The earth model includes a nonzero shear velocity in the direction of the symmetry axis for at least a subset of locations within the geologic medium (e.g., where it is geologically helpful). Based on the earth model, one or more seismic wavefields is propagated (e.g., time-stepped) over a plurality of timesteps using pseudoacoustic approximations to the fully elastic wave equation. In some embodiments, each wavefield represents a value of a respective state variable at each location in the geologic medium (e.g., each location on a computational grid). For simplicity, the terms "wavefield" and "state variable," and "seismic wavefield" are, in some embodiments, used interchangeably herein.

Reference will now be made in detail to various embodiments, examples of which are illustrated in the accompanying drawings. In the following detailed description, numerous specific details are set forth in order to provide a thorough understanding of the present disclosure and the described embodiments herein. However, embodiments described herein may be practiced without these specific details. In other instances, well-known methods, procedures, components, and mechanical apparatus have not been described in detail so as not to unnecessarily obscure aspects of the embodiments.

Figure 1:
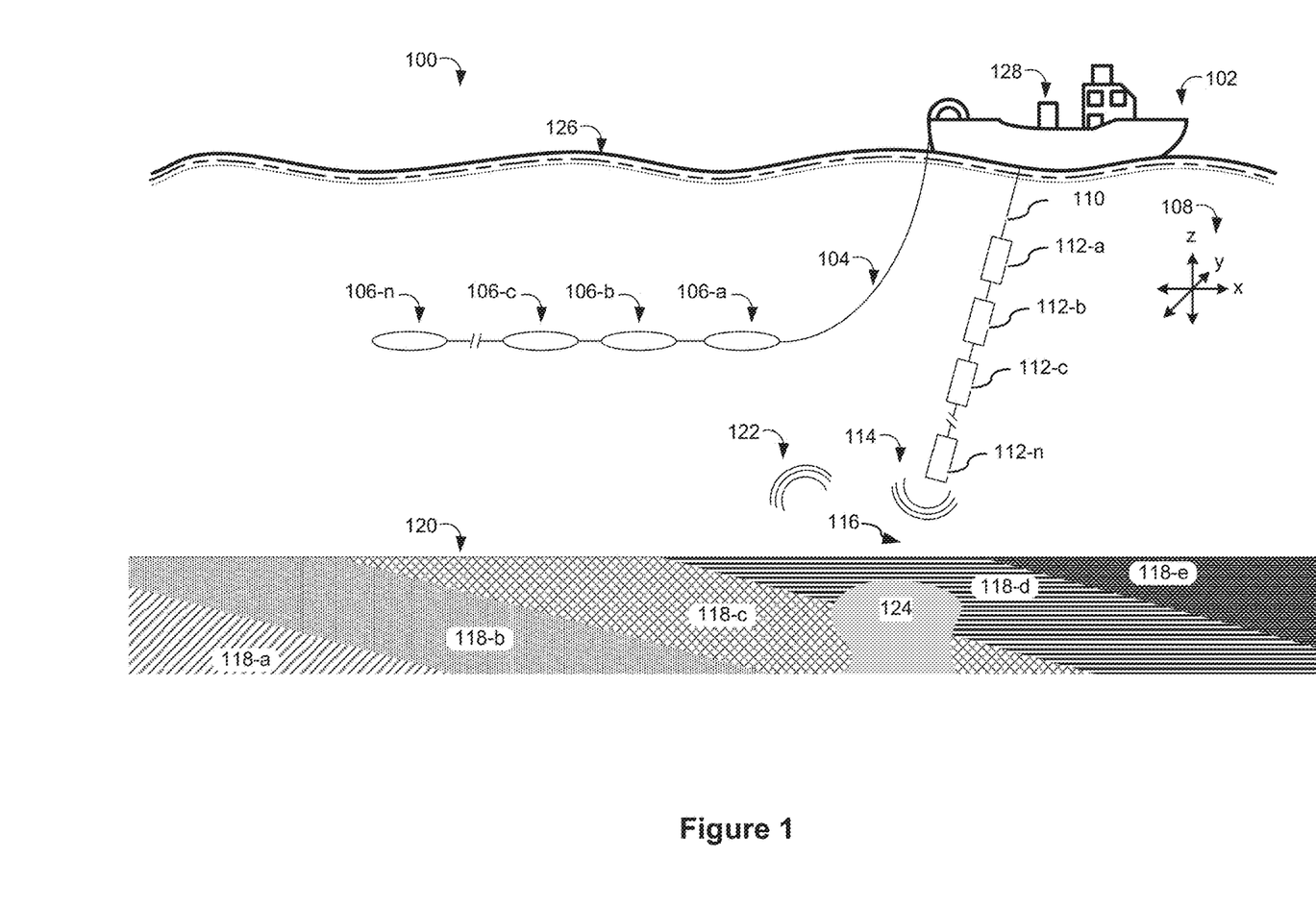
FIG. 1 is a schematic diagram of a marine seismic data acquisition environment, in accordance with some embodiments.

FIG. 1 is a schematic diagram of a marine seismic data acquisition environment 100, in accordance with some embodiments. In the environment 100, a survey vessel 102 tows one or more seismic streamers (one exemplary streamer 104 being depicted in FIG. 1) behind the vessel 102. The seismic streamers 104 may be several thousand meters long and may contain various support cables (not shown), as well as wiring and/or circuitry (not shown) that may be used to support communication along the streamers 104. In general, a streamer 104 includes a primary cable onto which seismic sensors 106 are mounted (e.g., seismic sensor 106-a, 106-b, 106-c through seismic sensor 106-n) that record seismic signals.

In some embodiments, the seismic sensors 106 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement (e.g., one or more of an inline (x), a crossline (y) and/or a vertical (z) component as shown in axes 108, for example), one or more components of a particle velocity, and one or more components of a particle acceleration.

In some embodiments, the multi-component seismic sensor may include one or more hydrophones, geophones, particle displacement sensors, particle velocity sensors, accelerometers, pressure gradient sensors, or a combination thereof.

For example, in some embodiments, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices. A particular multi-component seismic sensor may also include one or more pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The marine seismic data acquisition environment 100 includes one or more seismic source arrays 110. A source array 110, in turn, includes one or more strings of seismic sources such as air guns (e.g., seismic source 112-a, 112-b, 112-c through seismic source 112-n). In some embodiments, the seismic sources 112 may be coupled to, or towed by, the survey vessel 102. Alternatively, the seismic sources 112 may operate independently of the survey vessel 102, in that the source elements 112 may be coupled to, for example, other vessels or buoys.

As the seismic streamers 104 are towed behind the survey vessel 102, acoustic signals 114 (sometimes referred to as "shots") are produced by the seismic sources 112 and are directed down through a water column 116 into strata 118 (e.g., strata 118-a, 118-b, 118-c, 118-d, and 118-e each represent a respective layer of the geological medium) beneath a water bottom surface 120. Reflected acoustic signals 122 are reflected from the various subterranean geological features, such as an exemplary formation 124 (e.g., a salt dome).

The incident acoustic signals 114 produce corresponding reflected acoustic signals, or pressure waves, which are sensed by the seismic sensors 106. It is noted that the pressure waves that are received and sensed by the seismic sensors 106 include "up-going" pressure waves that propagate to the sensors 106 without reflection, as well as "downgoing" pressure waves that are produced by reflections of the pressure waves from an air-water boundary 126.

The seismic sensors 126 generate signals (digital signals, for example), called "traces," which indicate the acquired measurements of the pressure wavefield and particle motion (if the sensors are particle motion sensors). The traces are recorded and may be at least partially processed by a signal processing unit 128 that is deployed on the survey vessel 102, in accordance with some embodiments.

Figure 2:
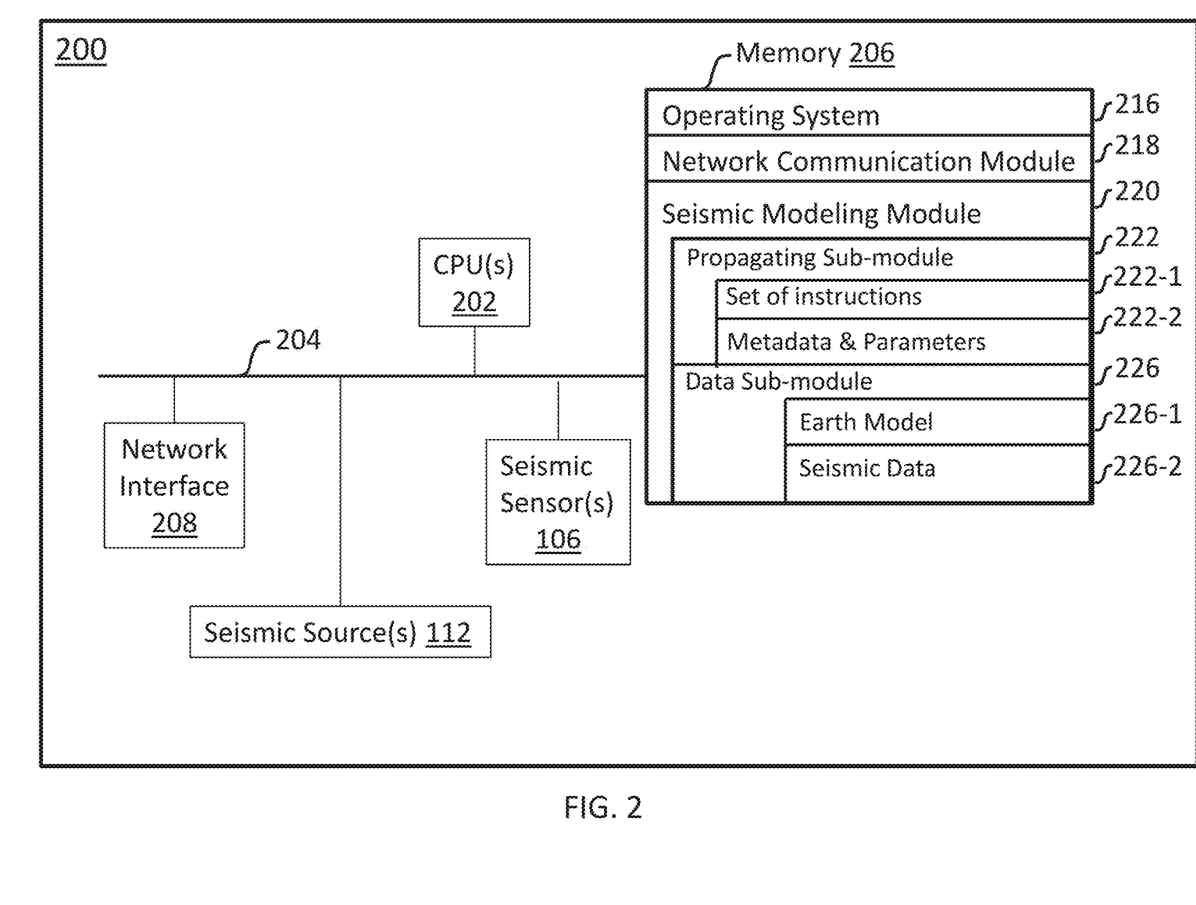
FIG. 2 is a block diagram illustrating a seismic modeling system, in accordance with some embodiments.

The goal of the seismic acquisition is to build up an image of a survey area for purposes of identifying subterranean geological media, such as the exemplary geological formation 124 (e.g., a salt dome). Subsequent analysis of the representation may reveal probable locations of hydrocarbon deposits in subterranean geological media. In some embodiments, portions of the analysis of the representation may be performed on the seismic survey vessel 102, such as by the signal processing unit 128. In some embodiments, the representation may be processed by a seismic modeling system (such as an exemplary seismic modeling system 200 that is depicted in FIG. 2 and is further described below) that may be, for example, located on land or on the vessel 102. Thus, many variations are possible and are within the scope of the appended claims.

One of ordinary skill in the art will appreciate that the marine seismic data acquisition environment 100 described above is merely an example of one of many different types of seismic data acquisition environments that may be used. For example, in some embodiments, the seismic data acquisition environment may use stationary sensor cables that are disposed on the seabed. As another example, in some embodiments, the seismic data acquisition environment may be a land-based environment in which sensor cables are buried in the earth. Thus, many variations are contemplated and are within the scope of the appended claims.

Seismic migration is a process that is typically used for purposes of imaging the reflectivity distribution in the earth. In some embodiments, seismic migration involves propagating (e.g., time-stepping) the signals that are recorded at the seismic sensors backwards in time to calculate one or more wavefields at the corresponding reflection points. In some embodiments, seismic migration also involves propagating (e.g., time-stepping) the signals that are produced at the seismic sources forward in time to calculate the wavefields at the corresponding reflection points. Seismic inversion is a process that is used to directly estimate the physical properties of the geological formations, in addition to the reflectivity distribution concerned by seismic migration. Both seismic migration and inversion may be complicated by seismic anisotropy (e.g., a tilted transverse anisotropy with a steep or heterogeneous direction of a symmetry axis), which can introduce instabilities in the backward and forward propagation of the respective signals, thereby undermining the imaging process. The conventional forward and backward propagators for TTI medium are not adjoint pairs, resulting in further instability in iterative schemes. Described in more detail below are systems and methods that mitigate or eliminate these instabilities by providing a novel self-adjoint wavefield propagator (the propagator works both in forward and backward in an adjoint sense) that are unconditionally stable and ⅓ faster than the current traditional propagators.

FIG. 2 is a block diagram illustrating a seismic modeling system 200, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic modeling system 200 includes one or more processing units (CPU's) 202, one or more network or other communications interfaces 208, memory 206, and one or more communication buses 204 for interconnecting these and various other components. The seismic modeling system 200 also optionally includes one or more seismic sensors 106 (e.g., geophones and/or hydrophones), one or more seismic sources 112 (e.g., air-guns). The communication buses 204 may include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, including the non-volatile and volatile memory device(s) within memory 206, comprises a non-transitory computer readable storage medium.

In some embodiments, memory 206 or the non-transitory computer readable storage medium of memory 206 stores the following programs, modules and data structures, or a subset thereof including an operating system 216, a network communication module 218, a seismic modeling module 220.

The operating system 216 includes procedures for handling various basic system services and for performing hardware dependent tasks.

The network communication module 218 facilitates communication with other devices (e.g., facilitates communication with the seismic sources 112 and/or the seismic sensors 106 if not included in the system 200, or facilitates communication with other land-based components) via the communication network interfaces 208 (wired or wireless) and one or more communication networks, such as the Internet, other wide area networks, local area networks, metropolitan area networks, and so on (e.g., in some embodiments, seismic modeling system 200 is located remotely from the seismic sources 112 and/or seismic sensors 106).

In some embodiments, the seismic modeling module 220 is configured to receive an earth model for a geologic medium. The seismic modeling module 220 processes one or more seismic measurements (e.g., received from seismic sensors 106) using a set of second-order pseudoacoustic equations applied in accordance with the earth model to calculate one or more seismic wavefields. The seismic modeling module 220 propagates the seismic wavefields over a plurality of time-steps in accordance with the set of pseudoacoustic equations. In accordance with predetermined criteria (described below with reference to method 300, FIG. 3, and method 400, FIG. 4), the seismic modeling module 220 applies a set of constraints (e.g., elliptical constraints or isotropic constraints) to adjust (or "reset") the seismic wavefields.

To that end, the seismic modeling module 220 optionally includes one or more sub-modules, each including a set of instructions and optionally including metadata and parameters. For example, in some embodiments, the seismic modeling module 220 propagates the seismic wavefields using a propagating sub-module 224 (which includes a set of instructions 224-1 and metadata and parameters 224-2, where the metadata and parameters may include a time-step duration) and stores data in a data sub-module 226 (which includes an earth model 226-1 and seismic data 226-2)

Figure 3:
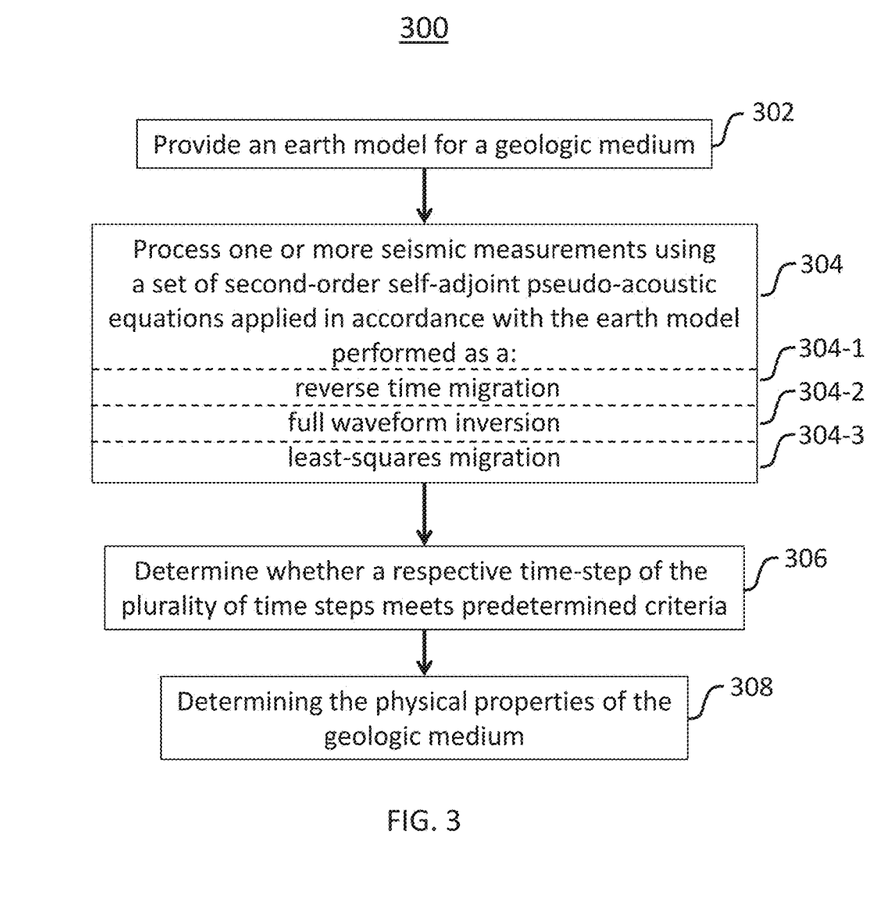
FIG. 3 is a schematic flowchart of a method of mitigating instabilities in a pseudoacoustic model, in accordance with some embodiments.

FIG. 3 is a schematic flowchart of a method 300 of mitigating instabilities in a pseudoacoustic model, in accordance with some embodiments. The method is, optionally, governed by instructions that are stored in computer memory or a non-transitory computer readable storage medium (e.g., memory 212 in FIG. 2) and that are executed by one or more processors (e.g., processor(s) 202) of one or more computer systems, including, but not limited to, signal processing unit 128 (FIG. 1) and/or system 200 (FIG. 2). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various embodiments, some operations in each method may be combined and/or the order of some operations may be changed from the order shown in the figures. Also, in some embodiments, operations shown in separate figures and/or discussed in association with separate methods may be combined to form other methods, and operations shown in the same figure and/or discussed in association with the same method may be separated into different methods. Moreover, in some embodiments, one or more operations in the methods are performed by modules of system 200 shown in FIG. 2, including, for example, processor(s) 202, seismic modeling module 220, memory 212, network interface 210, and/or any sub modules thereof.

The seismic modeling system provides (302) an earth model for a geologic medium. The geologic medium has a heterogeneous tilted symmetry axis, and the earth model includes a nonzero shear velocity in the direction of the symmetry axis for at least a subset of locations within the geologic medium. The earth model may include any combination of pressure wave and shear wave velocities, anisotropy parameters (e.g., a direction of the symmetry axis, sometimes called a "dip angle") and/or one or more values of a stiffness tensor C at a plurality of locations in the geologic medium (e.g., at each location in a computational grid). In some embodiments, C is a diagonal 6×6 stiffness tensor related to the Thomsen parameters $\delta$ and $\epsilon$ in that:

$$C = \begin{bmatrix} C_{11} & C_{11}-2C_{66} & C_{13} & 0 & 0 & 0 \\ C_{11}-2C_{66} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{bmatrix} \quad (1)$$

where:

$$C_{33} = \rho V_{pz}^2 \quad (2)$$

$$C_{11} = (1+2\epsilon)C_{33} \quad (3)$$

$$C_{13} = (\sqrt{f(f+2\delta)} - (1-f))C_{33} \quad (4)$$

$$C_{44} = (1-f)C_{33} \quad (5)$$

All other elements of the stiffness tensor C including $C_{66}$ are equal to zero. And, f is a so-called "f-factor" given by:

$$f = 1 - V_{SZ}^2/V_{PZ}^2 \quad (6)$$

which relates to a shear wave velocity in the vertical direction, $V_{SZ}$ and a pressure wave velocity in the vertical direction $V_{PZ}$. As used herein, vertical and horizontal are defined with respect to the anisotropy: the horizontal direction means any direction perpendicular to the axis of symmetry of the TTI medium and the vertical direction means a direction along the axis of symmetry of the TTI medium (e.g., the vertical and horizontal directions are defined, for example, at each location on the computational grid). In some circumstances, a TTI medium can be conceptually obtained by rotating the stiffness tensor of a vertically transverse isotropy at each point in space (e.g., differently at each point in space depending on the heterogeneous direction of the symmetry axis).

The seismic modeling system processes (304) one or more seismic measurements using a set of second-order pseudoacoustic equations applied in accordance with the earth model. In various embodiments, the one or more seismic measurements are field-recorded (e.g., measured by seismic sensors 106, FIG. 1), partially processed, and/or entirely synthetic (e.g., simulated source impulses corresponding to seismic sources 112, FIG. 1, or alternatively simulated source and/or sensor measurements that are simulated without regard to any specific source and/or sensor), or a combination thereof. The set of pseudoacoustic equations includes a first equation describing one or more seismic wavefields and a second equation describing the seismic wavefields.

As an example, the following standard 2×2 second-order pseudoacoustic systems of differential equations (e.g., coupled equations, sometimes called a "wave-propagator") provides an n to the computationally more expensive fully elastic TTI equations:

$$\partial_t^2 P = C_{11}\Delta_h P + (C_{13}+C_{44})\Delta_v Q + C_{44}\Delta_v P \quad (7)$$

$$\partial_t^2 Q = (C_{13}+C_{44})\Delta_h P + C_{33}\Delta_v Q + C_{44}\Delta_h Q \quad (8)$$

where P and Q are state variables describing the wavefields. In any event, $\Delta_v$ is a Laplacian operator in the vertical direction normalized by the density of the medium $\rho$ (because $\Delta_v$ is defined with respect to a single direction, it is also referred to and equivalent to a "second-derivative" with respect to the vertical direction); and, $\Delta_h$ is a Laplacian operator in the horizontal direction normalized by the density of the medium $\rho$ (i.e., a two-dimensional Laplacian operator). More specifically, $\Delta_v$ and $\Delta_h$ are given by the following equations, which also define the manner in which the respective Laplacian operators are normalized by the density of the medium $\rho$:

$$\Delta_h u = \tilde{g}_1\left(\frac{1}{\rho}g_1(u)\right) + \tilde{g}_2\left(\frac{1}{\rho}g_2(u)\right) \quad (9)$$

$$\Delta_v u = \tilde{g}_3\left(\frac{1}{\rho}g_3(u)\right) \quad (10)$$

where index 3 is a Cartesian direction of the axis of symmetry of the TTI medium and indexes 1 and 2 are orthogonal Cartesian directions perpendicular to the axis of symmetry of the TTI medium (u is a placeholder for any suitable operand). The differential operators $g_1$, $g_2$, $g_3$, $\tilde{g}_1$, $\tilde{g}_2$, and $\tilde{g}_3$ are defined below. The Laplacian operators $\Delta_v$ and $\Delta_h$ are related to a "three-dimensional" Laplacian operator $\Delta_{3D}$ by:

$$\Delta_{3D}u = \Delta_v u + \Delta_h u \quad (11)$$

$$= \tilde{g}_1\left(\frac{1}{\rho}g_1(u)\right) + \tilde{g}_2\left(\frac{1}{\rho}g_2(u)\right) + \tilde{g}_3\left(\frac{1}{\rho}g_3(u)\right)$$

$$= \partial_x\left(\frac{1}{\rho}\partial_x u\right) + \partial_y\left(\frac{1}{\rho}\partial_y u\right) + \partial_z\left(\frac{1}{\rho}\partial_z u\right)$$

In the above equations, (x, y, z) refer to the "non-rotated" coordinates (e.g., as specified by axes 108, FIG. 1) and $\partial_x$, $\partial_y$, and $\partial_z$ are "normal" partial derivatives along the non-rotated coordinates. Furthermore, in the above equations, the differential operators are defined as follows (e.g., the following operators achieve a rotation with respect to the non-rotated coordinates):

$$g_1(u) = \cos\theta\cos\phi\partial_x u + \cos\theta\sin\phi\partial_y u - \sin\theta\partial_z u \quad (12)$$

$$g_2(u) = -\sin\phi\partial_x u + \cos\phi\partial_y u \quad (13)$$

$$g_3(u) = \sin\theta\cos\phi\partial_x u + \sin\theta\sin\phi\partial_y u + \cos\theta\partial_z u \quad (14)$$

$$\tilde{g}_1(u) = \partial_x(\cos\theta\cos\phi u) + \partial_y(\cos\theta\sin\phi u) - \partial_z(\sin\theta u) \quad (15)$$

$$\tilde{g}_2(u) = -\partial_x(\sin\phi u) + \partial_y(\cos\phi u) \quad (16)$$

$$\tilde{g}_3(u) = \partial_x(\sin\theta\cos\phi u) + \partial_y(\sin\theta\sin\phi u) + \partial_z(\cos\theta u) \quad (17)$$

where $\phi$ is the azimuthal angle and $\theta$ is the dip angle.

It should be understood that the operators $\Delta_{3D}$, $\Delta_v$, and $\Delta_h$ are generalized Laplacian operators due to the inclusion of a buoyancy term given by $1/\rho$ at the appropriate locations as indicated in the equations above. For ease of explanation, these operators are referred to simply as "Laplacian operators." Moreover, such embodiments are not intended to limit that claims the follow; when used in the claims, the term "Laplacian" should be construed to include both standard Laplacian operators as well as more general forms such as those above, unless the claims clearly indicate otherwise.

The standard formulations based on Equations (7-8) are not, however, free from concerns. Occasionally these systems can appear to have instabilities, particularly when the material parameters are strongly variable, rendering the result unusable. These effects are especially damaging for iterative methods such as inversion. Accordingly, there is a need to develop a system that overcomes these instabilities and suitable for iterative inversion. Below we describe a family of 2×2 second-order pseudo-acoustic systems for transversely isotropic media that has the properties of being: (a) time-reversible, (b) self-adjoint, and (c) conserves complete energy.

The standard Equations (7-8) can be re-written in the following generalized form:

$$\partial_t^2 p = \tilde{A}_1(\partial_x^2 + \partial_y^2)p + \tilde{A}_2\partial_z^2 p \quad (18)$$

$$\text{where } p = \begin{bmatrix} P \\ Q \end{bmatrix}, \quad (19)$$

and $$\tilde{A}_1 = \begin{bmatrix} \tilde{a}_1 & \tilde{b}_1 \\ \tilde{c}_1 & \tilde{d}_1 \end{bmatrix}, \tilde{A}_2 = \begin{bmatrix} \tilde{a}_2 & \tilde{b}_2 \\ \tilde{c}_2 & \tilde{d}_2 \end{bmatrix}. \quad (20)$$

Equation (18) is not self-adjoint but satisfies the same dispersion relation shown below as the standard equations (7-8)

$$det(\omega^2 I - k_h^2 \tilde{A}_1 - k_z^2 \tilde{A}_2) \quad (21)$$

For system (18), there are 8 parameters that need to be determined and these are expressed by $\tilde{A}_1$ and $\tilde{A}_2$ in equation (20). These 8 parameters are constrained by the 5 conditions following from the dispersion relation in equation (21). Therefore there remain 3 parameters that need to be additionally explicitly constrained. Standard industry solutions were derived from dispersion relation considerations only in equation (21) yielding five conditions and leaving 3 parameters undetermined explicitly. The specifics of the previous schemes would determine these implicitly. Here we use 2 out of 3 remaining free parameters to derive a self-adjoint system and the last, $8^{th}$ parameter to relate the equations to physical wave types, thereby obtain a one-parameter family of self-adjoint 2×2 second-order pseudo-acoustic systems for heterogeneous TTI media.

System (18), however, can be rewritten in self-adjoint form. For system (18) to be self-adjoint the matrices $\tilde{A}_1$ and $\tilde{A}_2$ in equation (20) must be similar, giving us two more conditions:

$$\tilde{A}_1 = V_{Pz}^2 \begin{bmatrix} 1+2\epsilon & 0 \\ 0 & 1-f \end{bmatrix} \quad (22)$$

and $$\tilde{A}_2 = V_{Pz}^2 \begin{bmatrix} 1-f\dfrac{2(\epsilon-\delta)}{f+2\epsilon} & f\dfrac{\sqrt{2(\epsilon-\delta)(f+2\delta)}}{f+2\epsilon} \\ f\dfrac{\sqrt{2(\epsilon-\delta)(f+2\delta)}}{f+2\epsilon} & 1-f\dfrac{f+2\delta}{f+2\epsilon} \end{bmatrix} \quad (23)$$

with $$\hat{A}_1 = L\tilde{A}_1 L^{-1}, \hat{A}_2 = L\tilde{A}_2 L^{-1} \quad (24)$$

where L is an arbitrary invertible 2×2 matrix.
System (18) can be written as $$\partial_t^2 p = A_0[A_1(\partial_x^2 + \partial_y^2)p + A_2\partial_z^2 p], \quad (25)$$

where $$A_0 = \begin{bmatrix} a_0 & b_0 \\ c_0 & d_0 \end{bmatrix} = LL^T, A_1 = \begin{bmatrix} a_1 & b_1 \\ c_1 & d_1 \end{bmatrix} = L^{-T}\tilde{A}_1 L^{-1}, \quad (26)$$

$$A_2 = \begin{bmatrix} a_2 & b_2 \\ c_2 & d_2 \end{bmatrix} = L^{-T}\tilde{A}_2 L^{-1}$$

and $$\tilde{A}_1 = A_0 A_1, \tilde{A}_2 = A_0 A_2 \quad (27)$$

Since L is invertible, equations (26) and (27) are also invertible. So system (25) is equivalent to $$A_0^{-1}\partial_t^2 p = A_1(\partial_x^2 + \partial_y^2)p + A_2\partial_z^2 p, \quad (28)$$

which is in a self-adjoint form since $A_0$ (and thus also $A_0^{-1}$), $A_1$, and $A_2$ are all symmetric. For heterogeneous transversely isotropic medium, a medium that is frequently used to characterize geological formations, system (25) can be written as $$\partial_t^2 p = A_0[\tilde{g}_1(A_1 g_1(p)) + \tilde{g}_2(A_1 g_2(p)) + \tilde{g}_3(A_2 g_3(p))]. \quad (29)$$

From physical considerations, for this particular medium we also choose $$A_0 = \rho V_{PZ}^2 I. \quad (30)$$

Equation (29), based on equations (25) and (28), has many desired properties with advantages over previous pseudo-acoustic TTI systems. It is (a) it is time-reversible, self-adjoint, and conserves a complete energy. It also sets up a one-parameter family of 2×2 second-order pseudo-acoustic systems for heterogeneous TTI media. We identify below two instances where a specific choice of the remaining $8^{th}$ parameter leads to particularly efficient and physically meaningful systems.

In one instance, we use the remaining degree of freedom to set $b_1=0$ in $A_1$ and $A_2$, eliminating the horizontal-derivative cross terms, which gives $$A_1 = \frac{1}{\rho}\begin{bmatrix} 1+2\epsilon & 0 \\ 0 & 1-f \end{bmatrix}, \quad (31)$$

$$A_2 = \frac{1}{\rho}\begin{bmatrix} 1-f\frac{2(\epsilon-\delta)}{f+2\epsilon} & f\frac{\sqrt{2(\epsilon-\delta)(f+2\delta)}}{f+2\epsilon} \\ f\frac{\sqrt{2(\epsilon-\delta)(f+2\delta)}}{f+2\epsilon} & 1-f\frac{f+2\delta}{f+2\epsilon} \end{bmatrix}. \quad (32)$$

Since $A_0$ here is a scalar multiple of the identity matrix I, the matrices $A_1$ and $A_2$ here are scalar multiples of $\tilde{A}_1$ and $\tilde{A}_2$ in equations (22-23). After multiplying both sides by $A_0^{-1}$ to write the system in self-adjoint form, we obtain the system $$\frac{1}{\rho V_{P_z}^2}\partial_t^2 P = \tilde{g}_1\left(\frac{1+2\epsilon}{\rho}g_1(P)\right) + \tilde{g}_2\left(\frac{1+2\epsilon}{\rho}g_2(P)\right) + \tilde{g}_3\left(\frac{1}{\rho}\left(1-f\frac{2(\epsilon-\delta)}{f+2\epsilon}\right)g_3(P)\right) + \tilde{g}_3\left(f\frac{\sqrt{2(\epsilon-\delta)(f+2\delta)}}{\rho(f+2\epsilon)}g_3(Q)\right), \quad (33)$$

$$\frac{1}{\rho V_{P_z}^2}\partial_t^2 Q = \tilde{g}_3\left(f\frac{\sqrt{2(\epsilon-\delta)(f+2\delta)}}{\rho(f+2\epsilon)}g_3(P)\right) + \tilde{g}_1\left(\frac{1-f}{\rho}g_1(Q)\right) + \tilde{g}_2\left(\frac{1-f}{\rho}g_2(Q)\right) + \tilde{g}_3\left(\frac{1}{\rho}\left(1-f\frac{f+2\delta}{f+2\epsilon}\right)g_3(Q)\right). \quad (34)$$

The choice of eliminating the horizontal-derivative cross terms implies that equations (33) and (34) work better for refracted waves in a mostly horizontally stratified medium. This choice corresponds to keeping the angle between the anisotropy symmetry axis and the normal to the local inhomogeneity (compliance) parallel. System (33-34) has many desired properties, with advantages over previous pseudo-acoustic TTI systems. These include: (a) it is time-reversible, self-adjoint, and conserves a complete energy; (b) There are no material parameters inside any of the innermost spatial derivatives; (c) Only the material parameters $\epsilon$, $\delta$, $f$, $1/\rho$, and the rotations appear inside the outermost spatial derivatives; $V_{PZ}$ does not appear inside any spatial derivatives; (d) All the rotations appear between the inner and outer spatial derivatives; and (e) In addition, system (33-34) is very efficient. To evaluate the right-hand-side of both equations in the system for TTI media requires (with careful grouping of terms) only 12 first-derivative evaluations, compared with 18 first-derivative evaluations for the standard system (7-8).

In another instance, we use the remaining degree of freedom in $A_1$ and $A_2$ to set $b_2=0$, eliminating the vertical-derivative cross terms, which gives $$A_1 = \frac{1}{\rho}\begin{bmatrix} 1+2\delta & \sqrt{2(\epsilon-\delta)(f+2\delta)} \\ \sqrt{2(\epsilon-\delta)(f+2\delta)} & 2(\epsilon-\delta)+1-f \end{bmatrix}, \quad (35)$$

$$A_2 = \frac{1}{\rho}\begin{bmatrix} 1 & 0 \\ 0 & 1-f \end{bmatrix}. \quad (36)$$

After multiplying both sides by $A_0^{-1}$ to write the system in self-adjoint form, we obtain the system $$\frac{1}{\rho V_{P_z}^2}\partial_t^2 P = \tilde{g}_1\left(\frac{1+2\delta}{\rho}g_1(P)\right) + \tilde{g}_2\left(\frac{1+2\delta}{\rho}g_2(P)\right) + \tilde{g}_3\left(\frac{1}{\rho}g_3(P)\right) + \tilde{g}_1\left(\frac{\sqrt{2(\epsilon-\delta)(f+2\delta)}}{\rho(f+2\epsilon)}g_1(Q)\right) + \tilde{g}_2\left(\frac{\sqrt{2(\epsilon-\delta)(f+2\delta)}}{\rho(f+2\epsilon)}g_2(Q)\right), \quad (37)$$

$$\frac{1}{\rho V_{P_z}^2}\partial_t^2 Q = \tilde{g}_1\left(\frac{\sqrt{2(\epsilon-\delta)(f+2\delta)}}{\rho}g_1(P)\right) + \tilde{g}_2\left(\frac{\sqrt{2(\epsilon-\delta)(f+2\delta)}}{\rho}g_2(P)\right) + \tilde{g}_1\left(\frac{2(\epsilon-\delta)+1-f}{\rho}g_1(Q)\right) + \tilde{g}_2\left(\frac{2(\epsilon-\delta)+1-f}{\rho}g_2(Q)\right) + \tilde{g}_3\left(\frac{1-f}{\rho}g_3(Q)\right). \quad (38)$$

The choice of eliminating the vertical-derivative cross terms implies that equations (37) and (38) work better for reflected waves in a mostly horizontally stratified medium. This choice corresponds to keeping the angle between the anisotropy symmetry axis and the normal to the local inhomogeneity (compliance) orthogonal.

In any event, continuing with the description of method 300, processing the measurements includes propagating the seismic wavefields over a plurality of time-steps in accordance with the set of pseudoacoustic equations until a predetermined criterion is met (306). For example, in some embodiments, the one or more measurements are propagated in either a forward time-stepping or reverse time-stepping-direction for a user-defined number of time steps. Alternatively, in some embodiments, a first subset of the one or more measurements is propagated in a forward time-stepping direction and a second subset of the one or more measurements is propagated in the reverse time-stepping direction (e.g., the first subset comprises synthetic source "measurements" and the second subset comprised measured receiver measurements.)

In some embodiments, propagating the seismic wavefield includes calculating the seismic wavefields (e.g., the seismic wavefields described by P and Q) at a plurality of locations within the medium. In some embodiments, the plurality of locations (e.g., sometimes referred to as a "computational grid") is chosen to avoid spatial dispersion, while the time-steps are chosen in accordance with a stability condition.

For example, in some embodiments, the propagation is realized using a high-order finite differencing algorithm applied to Equations 33 and 34 or 37 and 38 (e.g., a finite differencing algorithm that is second-order in time and eighth-order in space). In some embodiments, boundary conditions at the edge of the geologic medium (e.g., the edge of the model) are included in the finite differencing algorithm to fully specify the model. For example, in some circumstances (e.g., such as offshore exploration where the top of the geologic medium is water), the boundary conditions include a free-surface boundary condition at the top of the geologic medium (e.g., the surface of the water) and absorbing boundary conditions on the respective sides and bottom of the model.

In some embodiments, an impulse is injected into Equations 33 and 34 or 37 and 38 and subsequently propagated (e.g., time-stepped) in time in either a forward time direction (e.g., when the impulse corresponds to a known or estimated source signal) or reverse time direction (e.g., when the impulse corresponds to a measured sensor signal). As used herein, the term impulse means an appropriate forcing function for the set of pseudoacoustic equations. For example, in some embodiments, the state variable P corresponds to a pressure wavefield and, moreover, can be decomposed into a response function $\hat{P}(\bar{r},t)$ (where $\bar{r}=(x, y, z)$ and t is time) and a forcing function $f(\bar{r}t)$ such that $P=\hat{P}+f$. In some such circumstances, the forcing function $f(\bar{r}, t)$ can be written:

$$f(\bar{r},t) = \gamma \delta(\bar{r}-\bar{r}_0) f_s(t) \qquad (18)$$

where $\gamma$ is a scaling factor, $\bar{r}_0$ is a location of a respective seismic source or a respective seismic sensor, $\delta$ is the Dirac delta function, and $f_s(t)$ is the source or sensor signal corresponding to the respective seismic source or the respective seismic sensor.

In some circumstances, the forward modeling comprises a migration when an impulse is propagated in either the forward time direction or the reverse time direction to a respective time when the impulse is reflected by a geological feature. In some embodiments, a source signal is propagated in the forward time direction to a respective time and a sensor signal is propagated in a reverse time direction to the respective time in a process known as reverse time migration (RTM) (304-1). A correlation between a result of the forward time propagation and a result of the reverse time propagation (e.g., a cross-correlation of the results, or a convolution of the results) is used to produce an image of the geologic medium.

In some other embodiments, the forward modeling comprises a full waveform inversion (304-2) when a source signal is propagated in the forward time direction to a respective time and a sensor signal is propagated in a reverse time direction to the respective time for the current model of the geological medium. A correlation between a result of the forward time propagation and a result of the reverse time propagation (e.g., a cross-correlation of the results, or a convolution of the results) is used to produce an update of the geologic medium. This process repeats until a satisfactory model of the geological medium is obtained. This model is used to estimate anisotropic and other material properties of the geological formations.

Figure 4:
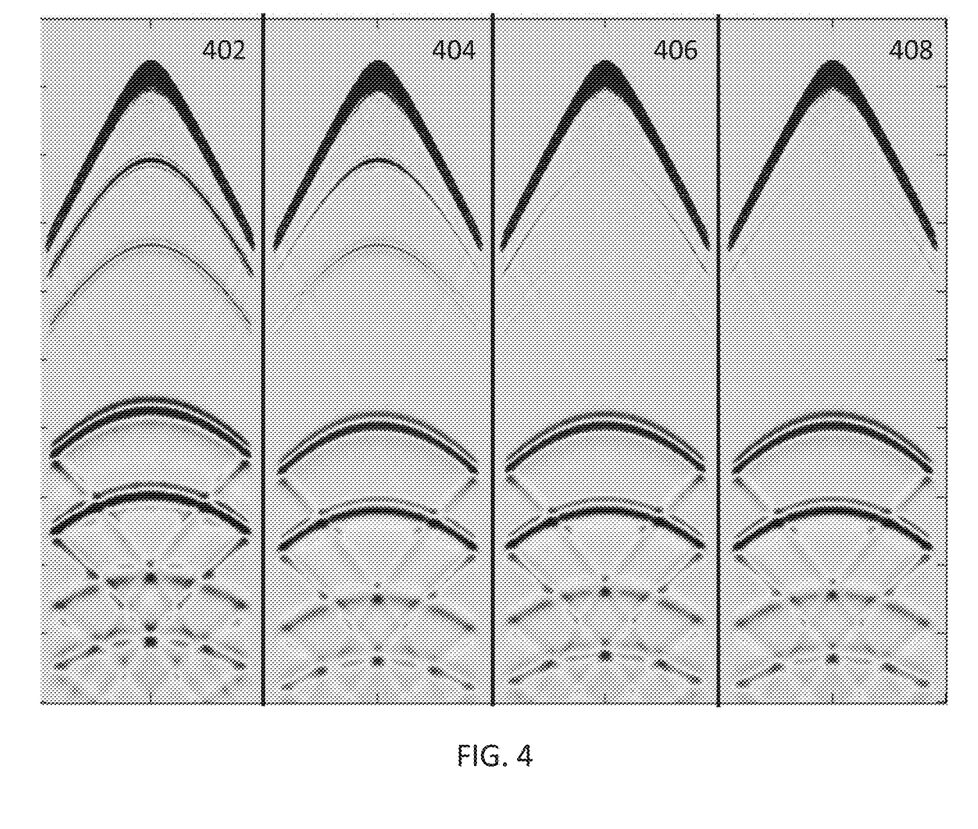
FIG. 4 illustrates results of an embodiment of the present invention.
Figure 5:
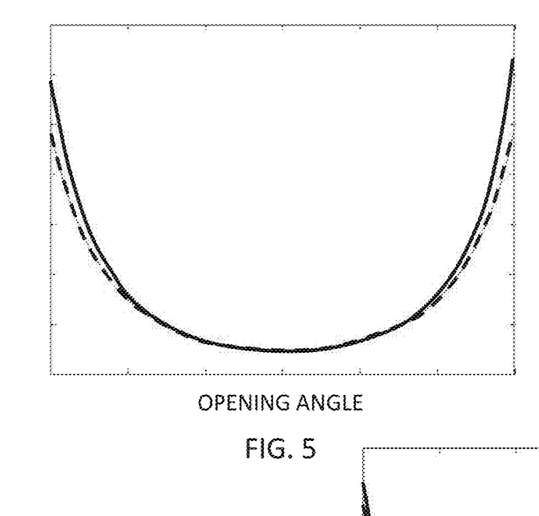
FIG. 5 compares a result of an embodiment of the present invention with a correct answer.

An example of an embodiment of the present invention may be seen in FIG. 4. Here, the wavefield propagator has been used to forward model a wavefield into an earth model consisting of two layers. The layer boundary is represented by the strong event halfway down the section. Panel 402 shows the recorded response when the layers have different P-wave velocities ($V_p$), panel 404 shows the recorded response when the two layers have different densities ($\rho$), panel 406 shows the recorded response when the two layers have different anisotropy parameters delta ($\delta$), and panel 408 shows the recorded response when the two layers have different anisotropy parameters eta ($\epsilon$). All of these responses appear similar but are, in fact, different when the amplitudes and opening angles are considered. These are more closely examined in FIGS. 5-7. FIG. 5 shows the amplitudes along the primary reflection for the $V_p$ difference (event halfway down panel 402). The dashed curve shows the correct amplitudes, per the Shuey equation. The solid curve shows the amplitudes generated by the self-adjoint pseudoacoustic wave propagator of the present invention.

Figure 6:
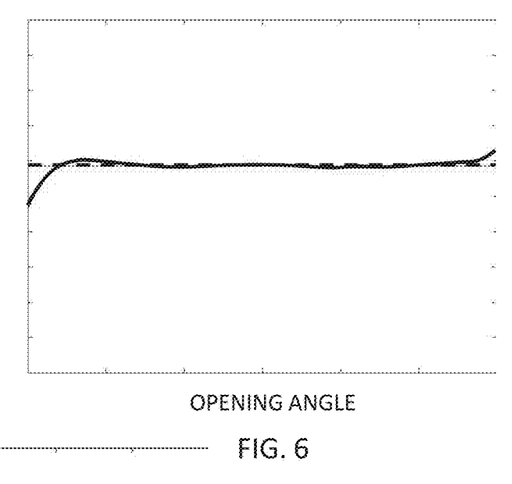
FIG. 6 compares another result of an embodiment of the present invention with a correct answer.
Figure 7:
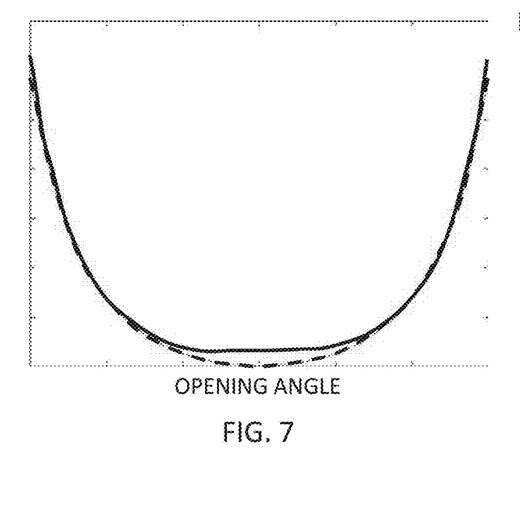
FIG. 7 compares another result of an embodiment of the present invention with a correct answer.

Similarly, the solid curve FIG. 6 compares the amplitudes of the event in panel 404 with the dashed Shuey equation amplitudes for a difference in density. FIG. 7 shows the dashed Shuey equation amplitudes for a change in anisotropy parameter delta ($\delta$) along with the solid curve from panel 406. The wave propagator of the present invention agrees very well with the Shuey equation answers.

Figure 8:
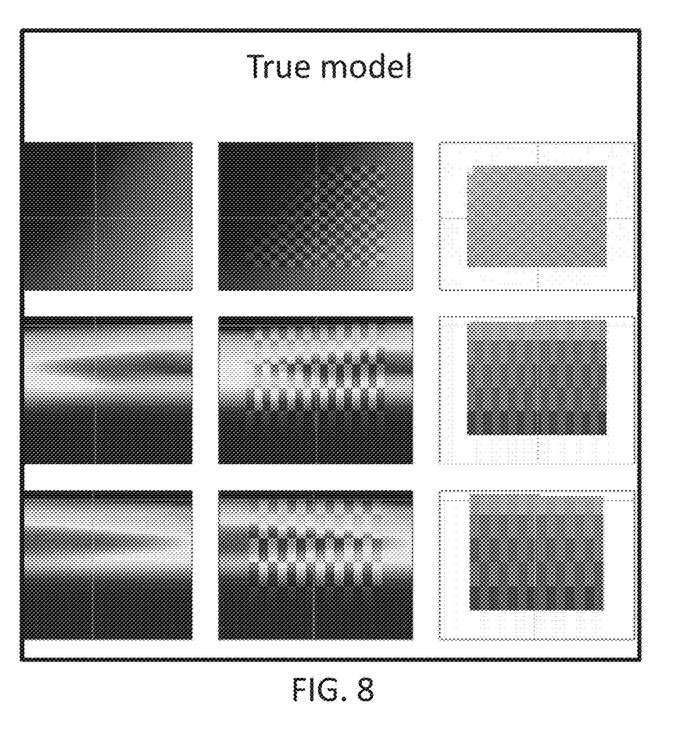
FIG. 8 is a complex true subsurface model.
Figure 9:
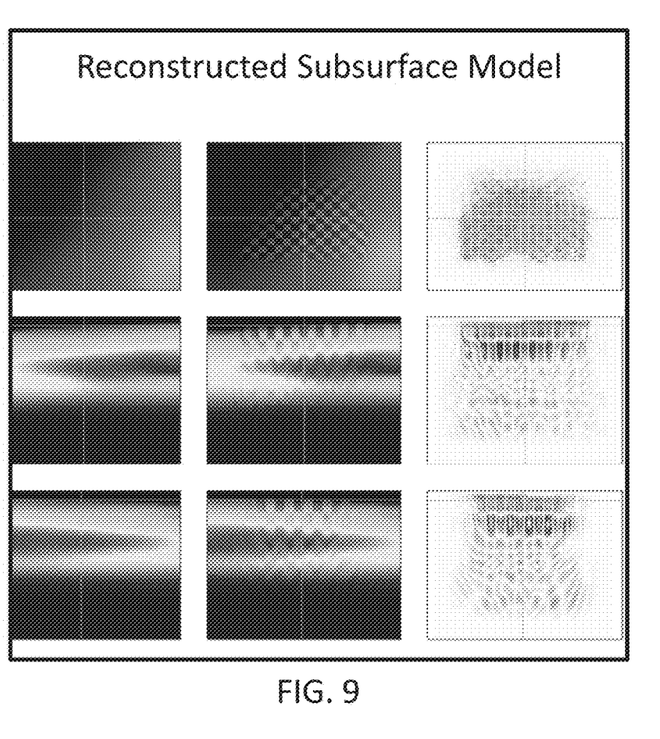
FIG. 9 is the result of an embodiment of the present invention, seeking to recover the true model of FIG. 8.

A complex example of the present invention, using the self-adjoint pseudo-acoustic wave propagator in a full waveform inversion (FWI), is seen in FIGS. 8 and 9. FIG. 8 shows the true 3D subsurface model. FIG. 9 shows the result of the FWI. In FIG. 8, the first column shows an initial model, which has complications added to it in the second column. The complicated checkerboard pattern that is added to the first column to get the second column is shown in the third column. The second column is considered the "correct" model. The first row of FIG. 8 is a map view (x-y plane), the second row is a x-z vertical slice, and the third row is a y-z vertical slice. FIG. 9 has the initial model used as input to the FWI in the first column (it is the same as the first column of FIG. 8) and the result of using the self-adjoint pseudoacoustic wave propagator in a FWI in the second column, with the difference between the first and second column in the third column. The rows of FIG. 9 are the same map view and vertical slices as FIG. 8. Compare the second and third columns of FIG. 9 with those of FIG. 8 to see how accurately this embodiment of the present invention has recreated the true subsurface model. The FWI result (reconstructed subsurface model) in FIG. 9 compares favorably to the true model in FIG. 8.

It should be understood that the criteria described above (e.g., with respect to operations 316-324) may be used alone or may be combined logically (e.g., using a logical operator such as "AND," "OR," etc).

In some embodiments, processing one or more seismic measurements includes performing reverse-time migration (304-1) to the one or more seismic wavefields to generate a seismic image of the geologic medium. In some other embodiments, processing one or more seismic measurements includes performing full waveform inversion (304-2) to one or more seismic wavefields to generate an update of the reconstructed earth model. In yet another embodiment, processing one or more seismic measurements includes performing least-squares migration (304-3) to the one or more seismic wavefields to generate a seismic image of the geologic medium.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   receiving, at one or more processors, one or more seismic measurements corresponding to a plurality of source and receiver locations;
   providing, to the one or more processors, an earth model for a geologic medium, the geologic medium having a heterogeneous tilted symmetry axis, wherein the earth model includes a nonzero shear velocity in the direction of the symmetry axis for at least a subset of locations within the geologic medium;
   propagating, via the one or more processors, the one or more seismic measurements over a plurality of time-steps in accordance with the earth model and a set of energy-conservative self-adjoint pseudoacoustic equations, the set of energy-conservative self-adjoint pseudoacoustic equations including a first equation describing one or more seismic wavefields and a second equation describing the one or more seismic wavefields, wherein the set of energy-conservative self-adjoint pseudoacoustic equations include a correct full-elastic quasi-P-wave dispersion relationship and are time-reversible to generate a forward propagated wavefield and a backward propagated wavefield; and
   correlating, via the one or more processors, the forward propagated wavefield and the backward propagated wavefield to determine physical properties of the geologic medium.

2. The method of claim 1, wherein the earth model comprises a tilted transverse isotropic model.

3. The method of claim 1 further comprising using the propagating in any iterative seismic processing.

4. The method of claim 3 wherein the iterative seismic processing is least-squares migration.

5. The method of claim 3 wherein the iterative seismic processing is full waveform inversion.

6. The method of claim 1 wherein the first equation and the second equation eliminate horizontal-derivative cross terms and are used for reverse time migration.

7. The method of claim 1 wherein the first equation and the second equation eliminate vertical-derivative cross terms and are used for full waveform inversion.

8. A computer system, comprising:
   one or more processors;
   memory; and
   one or more programs, wherein the one or more programs are stored in the memory and configured to be executed by the one or more processors, the one or more programs including instructions that when executed by the one or more processors cause the device to execute:
   receiving one or more seismic measurements corresponding to a plurality of source and receiver locations;
   providing an earth model for a geologic medium, the geologic medium having a heterogeneous tilted symmetry axis, wherein the earth model includes a nonzero shear velocity in the direction of the symmetry axis for at least a subset of locations within the geologic medium;
   propagating the one or more seismic measurements over a plurality of time-steps in accordance with the earth model and a set of energy-conservative self-adjoint pseudoacoustic equations, the set of energy-conservative self-adjoint pseudoacoustic equations including a first equation describing one or more seismic wavefields and a second equation describing the one or more seismic wavefields, wherein the set of energy-conservative self-adjoint pseudoacoustic equations include a correct full-elastic quasi-P-wave dispersion relationship and are time-reversible to generate a forward propagated wavefield and a backward propagated wavefield; and
   correlating the forward propagated wavefield and the backward propagated wavefield to determine physical properties of the geologic medium.

9. A non-transitory computer readable storage medium storing one or more programs, the one or more programs comprising instructions, which when executed by an electronic device with one or more processors and memory, cause the device to execute the steps of:
   receiving one or more seismic measurements corresponding to a plurality of source and receiver locations;
   providing an earth model for a geologic medium, the geologic medium having a heterogeneous tilted symmetry axis, wherein the earth model includes a nonzero shear velocity in the direction of the symmetry axis for at least a subset of locations within the geologic medium;
   propagating the one or more seismic measurements over a plurality of time-steps in accordance with the earth model and a set of energy-conservative self-adjoint pseudoacoustic equations, the set of energy-conservative self-adjoint pseudoacoustic equations including a first equation describing one or more seismic wavefields and a second equation describing the one or more seismic wavefields, wherein the set of energy-conservative self-adjoint pseudoacoustic equations include a correct full-elastic quasi-P-wave dispersion relationship and are time-reversible to generate a forward propagated wavefield and a backward propagated wavefield; and correlating the forward propagated wavefield and the backward propagated wavefield to determine physical properties of the geologic medium.

* * * * *